June 26, 1956
G. A. KANELOS
2,751,920
LIQUID FEEDER VALVE UNIT
Filed June 14, 1952
3 Sheets-Sheet 1
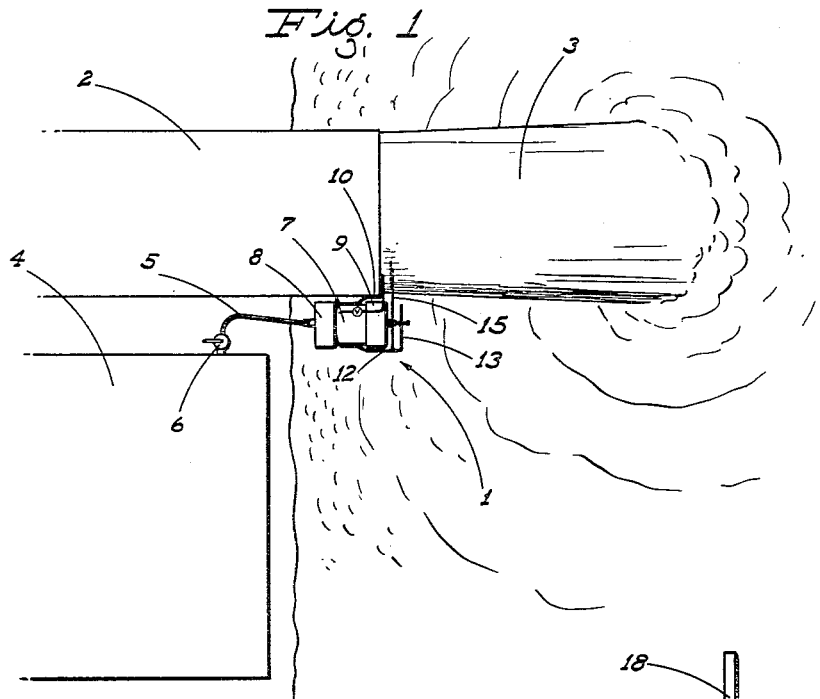
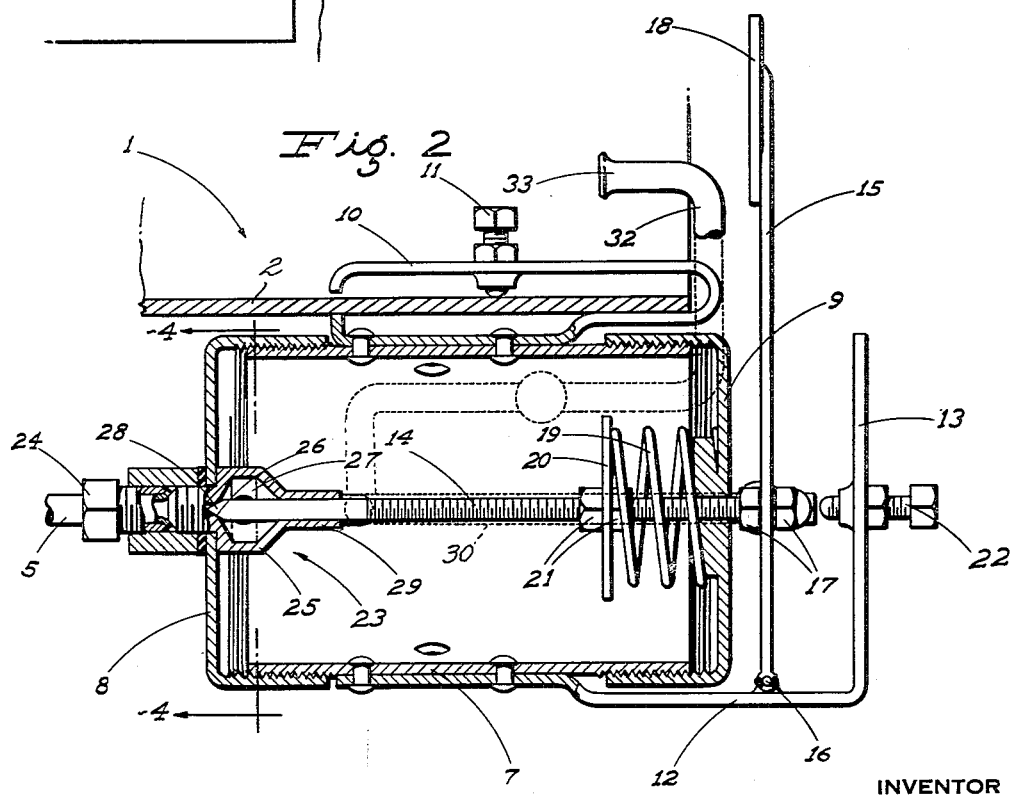
INVENTOR
GEORGE A. KANELOS
BY
Webster & Webster
ATTORNEYS

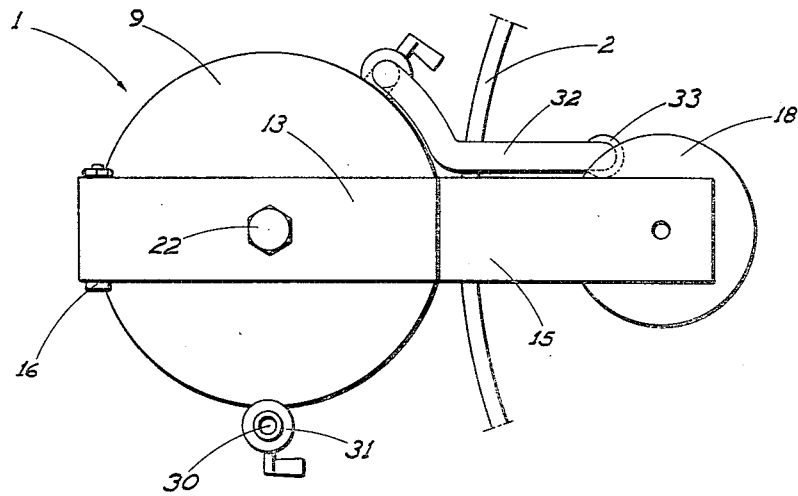
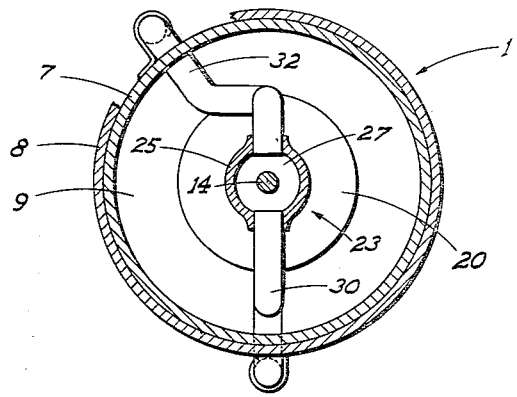
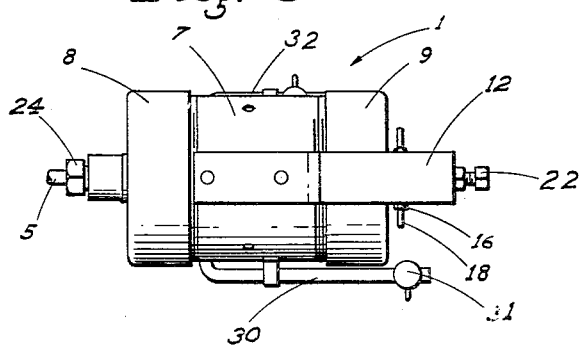

June 26, 1956

G. A. KANELOS 2,751,920

LIQUID FEEDER VALVE UNIT

Filed June 14, 1952

INVENTOR
GEORGE A. KANELOS
BY
Webster & Webster
ATTORNEYS

United States Patent Office 2,751,920
Patented June 26, 1956

2,751,920

LIQUID FEEDER VALVE UNIT

George A. Kanelos, Sacramento, Calif., assignor of forty-nine per cent to Sam J. Bacchini, Florin, Calif.

Application June 14, 1952, Serial No. 293,613

2 Claims. (Cl. 137—98)

The present invention is directed to, and it is a major object to provide, a valve unit operative to feed a liquid insecticide into a body of water, as in a ditch or pond, for mosquito control or similar purpose.

Another object of this invention is to provide a liquid feeder valve unit which is adapted to be mounted in connection with the water discharge pipe of a pump; the device functioning automatically in response to a water stream flowing in and discharging from such pipe.

An additional object of the invention is to provide a liquid feeder valve unit, which—with a minimum of modification—is adapted to be mounted for float control in response to the variation in the water level in the ditch or pond to be treated with the liquid insecticide.

A further object of the invention is to provide a liquid feeder valve unit which includes a liquid control valve assembly and a novel flushing system therefor operative to maintain the valve clean; the liquid insecticide otherwise tending to gum or foul the valve, which prevents the proper functioning thereof.

It is also an object of the invention to provide a liquid feeder valve unit which is designed for ease and economy of manufacture; convenience of installation; and long service with a minimum of manual attendance.

Still another object of the invention is to provide a practical, reliable, and durable liquid feeder valve unit, and one which will be exceedingly effective for the purpose for which it is designed.

These objects are accomplished by means of such structure and relative arrangement of parts as will fully appear by a perusal of the following specification and claims.

In the drawings:

Fig. 1 is a plan view of a pump discharge pipe showing the liquid feeder valve unit as mounted in connection therewith and in use.

Fig. 2 is an enlarged sectional plan view of the device in use as in Fig. 1.

Fig. 3 is an enlarged outer end elevation of the device as mounted on a pump discharge pipe.

Fig. 4 is a cross section on line 4—4 of Fig. 2.

Fig. 5 is an outer side elevation of the device, detached.

Figure 6:
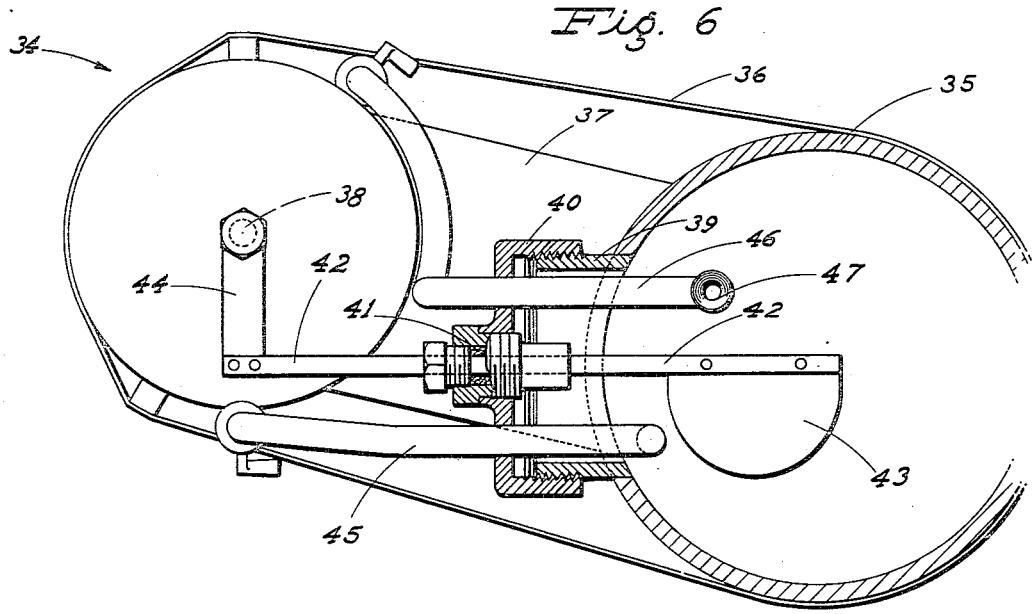
Fig. 6 is a transverse vertical elevation, partly in section, showing a modified mount for the unit.

Referring now more particularly to the characters of reference on the drawings, and at present to Figs. 1–5 inclusive, the liquid feeder valve unit is indicated generally at 1, being mounted exteriorly on the forward end portion of a pump discharge pipe 2 which delivers a water stream 3 into a ditch or pond; it being understood that the pump functions only at intervals.

The liquid feeder valve unit is fed liquid insecticide, preferably under considerable gravitational force or under pressure, from a tank 4 coupled to the unit 1 by a feed pipe 5 having a hand valve 6 interposed therein.

The purpose of the liquid feeder valve unit 1 is to deliver, into the water as it leaves the discharge pipe 2, a regulated quantity of the liquid insecticide from the tank 4; the unit opening only in response to flow of the water stream 3, and the liquid insecticide being introduced into the water for the purpose of controlling mosquitos or the like.

The valve unit 1 comprises a cylindrical body 7 having a rear end cap 8 and a front end cap 9 secured thereon, preferably by threading.

The body 7, when the unit 1 is in use, is disposed alongside the pump discharge pipe 2, and at which time an elongated C-shaped attachment bracket 10—which is fixed to the body 7—straddles said pipe 2 from its forward end. The attachment bracket 10 is secured to the pipe 2 by means of a set screw 11 which runs through the arm of said bracket most remote from the body 7. With this arrangement the body 7 is effectively rigidly supported alongside the discharge pipe 2 with the forward end of said body substantially alined with the open end of said pipe. On the side opposite the attachment bracket 10 the body 7 has a longitudinal extension bar 12 fixed thereon, which bar projects forwardly to a point spaced ahead of the front end cap 9, and there the bar turns and projects laterally as a fixed arm 13.

A valve control rod 14 extends, axially and slidably, in the body 7, projecting centrally through the front end cap 9 and thence passing in loose-play relation through a laterally extending lever arm 15 pivoted, as at 16, to the bar 12 for swinging motion generally lengthwise of the rod 14.

The lever arm 15 is connected in operative relation to the rod 14 by spaced nuts 17 threaded on said rod and disposed on opposite sides of the arm 15 with sufficient spacing to not obstruct swinging of the latter.

At the free end—i. e. the end opposite the pivot 16—the lever arm is of sufficient length that it projects in front of the open or outlet end of the pipe 2, being there fitted with a vane 18.

The valve control rod 14 is normally maintained in a retracted position by means of a helical compression spring 19 which surrounds said rod between the front end cap 9 and a washer 20 held in position by nuts 21. Advancing motion of the rod 14, against the compression of spring 20, is caused by the water stream 3 impinging against the vane 18, with resultant swinging of the lever arm 15 forwardly, which forward motion is limited by an adjustment screw 22 threaded through the fixed arm 13 in alinement with the adjacent end of the rod.

The rear end cap 8 serves as the mount, centrally thereof, for a needle valve assembly indicated generally at 23; the latter being coupled at its outer end, by a fitting 24, to the feed pipe 5 leading from the tank 4.

Internally of the body 7 the needle valve assembly 23 includes a valve seat housing 25 which encloses a valve seat 26 opening between the fitting 24 and an internal chamber 27 in said housing 25. Liquid insecticide flowing from the tank 4 through the pipe 5 delivers through the seat 26 into the internal chamber 27, but only when a needle valve 28—which normally closes said seat—is shifted forwardly to an open position. As shown, the needle valve 28 is formed on the inner end of the valve control rod 14; the latter entering the needle valve assembly 23 through a guide sleeve 29.

In operation of the above described liquid feeder valve unit 1 the water stream 3, as it discharges from the pipe 2, works the arm 15 and rod 14 as previously described, which results in opening of the needle valve 28 and the flow of liquid insecticide through the needle valve assembly 23. Such liquid insecticide, after entering the internal chamber 27, delivers downwardly through a discharge pipe 30 which communicates with the housing 25 at the bottom.

From the housing 25 the discharge pipe 30 extends out of the body 7 and thence projects forwardly to deliver the insecticide into the same receiving basin to which the pipe 2 delivers the water stream 3. Exteriorly of the body 7 the discharge pipe 30 includes a normally open hand valve 31.

Upon the water stream 3 discontinuing its flow from the pipe 2, the spring 17 immediately swings the arm 15 inwardly and shifts the rod 14 in a corresponding direction, closing the needle valve 28 against the seat 26 whereby the unit is shut off until the next pumping operation.

The following novel flushing system is employed in order to maintain the seat 26 against fouling or gumming, and which otherwise tends to occur from the liquid insecticide:

A water feed pipe 32 is connected at its inner end to the valve seat housing 25, communicating with the internal chamber 27 in opposition to the pipe 30. From the housing 25 the pipe 32 runs out of the body 7 and thence is suitably bent so that its other end portion enters the pipe 2; the pipe 32, having a flared intake 33 facing against the flow. Each time that the water stream 3 flows, a small portion of the water is received by the flared intake 33 and flows through the pipe 32 into the chamber 27, effectively flushing out such chamber and maintaining the seat 26 clean; the water thence flowing out through the discharge pipe 30, carrying with it the liquid insecticide which feeds through the needle valve assembly 23, as aforesaid.

The described liquid feeder valve unit provides a relatively simple but reliable device for the feeding of liquid insecticide into a water stream each time the latter flows, with the device working automatically in response to such flow.

In Fig. 6 there is disclosed a modified mount which permits the unit to be attached on the discharge pipe 2 at a point other than its outer end. Here the liquid feeder valve unit is indicated generally at 34, being attached to the pump discharge pipe 35 alongside the same by an encircling or retention strap 36; there being a cradle block 37 between the unit 34 and pipe 35.

With the unit 34 so mounted the axially projecting control rod 38, which corresponds to the rod 14 of Fig. 2, is automatically worked by water stream flow in the pipe 35, as follows:

To one side of the cradle block 37 the pipe 35 is formed with a tubular neck 39 closed by a threaded-on cap 40; said cap carrying a packing gland 41 through which a rod 42 turnably extends. At its inner end the rod 42 projects into the pipe 35 and is there fitted with a vane 43. At its outer or free end the rod 42 carries an upstanding finger connected to the control rod 38.

Thus, upon water stream flow in the pipe 35 impinging against the vane 43, the rod 42 is part-rotated, whence the finger 44 pulls on the control rod 38 to open the needle valve assembly (not shown). When this occurs the liquid insecticide feeds from the unit 34 through a discharge pipe 45, which corresponds to the pipe 30 of the previous embodiment, but here said pipe 45 leads through the cap 40 and discharges the insecticide directly into the pipe 35. In this embodiment the flushing system for the needle valve assembly is also used; the water feed pipe 46, corresponding to the pipe 32, leading through the cap 40 and having an intake 47 turned against the direction of flow in the pipe 35.

Figure 7:
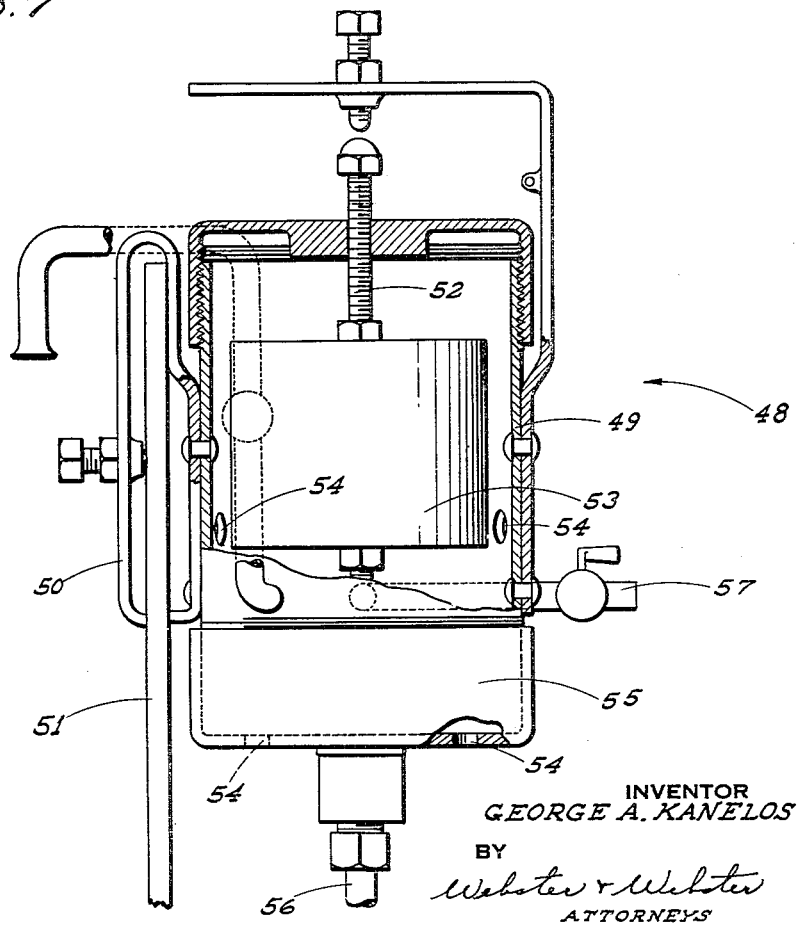
Fig. 7 is a vertical elevation, partly in section, showing the unit as modified for float controlled use.

In Fig. 7 the liquid feeder valve unit, as previously described in detail in connection with Figs. 1–5 inclusive, is shown as it is modified for vertical installation on a post and for float control from the water level in the ditch or pond, and wherein such water level is subject to recurrent rise and fall.

In this embodiment the unit is indicated generally at 48, and the body 49 is disposed with its axis vertical; the elongated C-shaped attachment bracket 50 being secured on the upper end of a post 51 which upstands in the ditch or pond.

Here the valve controlled rod 52 is fitted, within the body 49, with a cylindrical float 53; the spring 19 used when the device is pipe-mounted being here omitted.

Openings 54 in the body 49 and end cap 55 permit the water to seek a level within the body the same as exteriorly thereof. Consequently, upon raising of the cylindrical float 53, the needle valve assembly (not shown) is worked in just the same manner as previously described; liquid insecticide then delivering from feed pipe 56 to discharge pipe 57; the latter feeding the liquid insecticide into the ditch or pond wherein the post 51 is disposed.

The liquid feeder valve unit is used vertical and post-supported, as in Fig. 7, at points along a ditch or in a pond where no pump discharge pipe is available for mounting of the device.

From the foregoing description it will be readily seen that there has been produced such a device as will substantially fulfill the objects of the invention, as set forth herein.

While this specification sets forth in detail the present and preferred construction of the device, still in practice such deviations therefrom may be resorted to as do not form a departure from the spirit of the invention, as defined by the appended claims.

Having thus described the invention, the following is claimed as new and useful and upon which Letters Patent are desired:

1. A liquid feeder valve unit comprising a cylindrical body having a rear end cap and a front end cap, a normally closed valve assembly mounted on the rear end cap, pipe means arranged to deliver liquid to and from the valve assembly, a slidable valve control rod extending from the valve assembly forwardly through the front end cap, a rearwardly opening C clamp on the inner side of the body adapted to straddle a pump discharge pipe from its outlet end so as to secure the body to said pipe, an extension bar projecting forward from the body on its outer side, a lever arm pivoted on the extension bar ahead of the front end of the body and projecting laterally thereacross to a termination in front of said outlet end of the pump discharge pipe, means connecting the lever arm and adjacent portion of the rod, and spring means in the body yieldably resisting forward swinging of the lever arm and resultant forward sliding of the rod, the valve assembly opening upon the rod so sliding forward.

2. A unit, as in claim 1, in which the extension bar is formed with a fixed lateral arm ahead of the lever arm, and a stop screw threaded through said fixed arm to limit forward motion of the lever arm and rod.

References Cited in the file of this patent

UNITED STATES PATENTS

| 711,295 | Deare | Oct. 4, 1902 |
| 843,080 | Ermentrout | Feb. 5, 1907 |
| 1,332,310 | Shover | Mar. 2, 1920 |
| 2,351,579 | Beckman | June 20, 1944 |
| 2,493,297 | London | Jan. 3, 1950 |

FOREIGN PATENTS

| 28,915 | Great Britain | Dec. 13, 1910 |
| 335,818 | Germany | Apr. 16, 1921 |
| 582,087 | Germany | Aug. 8, 1933 |
| 535,017 | Great Britain | Mar. 26, 1941 |